United States Patent [19]
Armbruster

[11] 3,828,580
[45] Aug. 13, 1974

[54] COUPLING CONSTRUCTION
[75] Inventor: Gerhard Armbruster, Stuttgart, Germany
[73] Assignee: Robert Bosch G.m.b.H., Stuttgart, Germany
[22] Filed: June 21, 1973
[21] Appl. No.: 372,407

Related U.S. Application Data
[63] Continuation of Ser. No. 139,612, May 3, 1971, abandoned.

[52] U.S. Cl. .............. 64/30 A, 64/27 NM, 279/103
[51] Int. Cl. .............................................. F16d 7/02
[58] Field of Search .. 64/30 A, 30 D, 30 E, 27 NM, 64/5, 4, 11 R; 192/66, 65; 279/103, 102

[56] References Cited
UNITED STATES PATENTS
| 2,637,986 | 5/1953 | Iredell | 64/27 NM |
| 2,841,261 | 7/1958 | Abrams | 192/66 |
| 2,955,492 | 10/1960 | Linsker | 279/103 X |
| 2,955,832 | 10/1960 | Gary | 279/103 |
| 3,064,452 | 11/1962 | Gast, Jr. | 64/30 R |

FOREIGN PATENTS OR APPLICATIONS
| 858,153 | 1/1961 | Great Britain | 279/103 |

Primary Examiner—Samuel Scott
Assistant Examiner—Randall Heald
Attorney, Agent, or Firm—Michael S. Striker

[57] ABSTRACT

An attachment for transmitting power between a motor-driven tool and an auxiliary tool has a rotary shaft one end portion of which is drivingly connectable with an auxiliary tool and the other end portion of which carries a coupling member of elastomeric material. An end face of the coupling member extends transversely of the axis of rotation of the shaft and is provided with a conical recess into which a rotary component of a motor-driven tool can be inserted so that, when axial pressure is exerted, the rotary component will frictionally engage and transmit power to the coupling member and via the same to the shaft.

6 Claims, 1 Drawing Figure

PATENTED AUG 13 1974
3,828,580
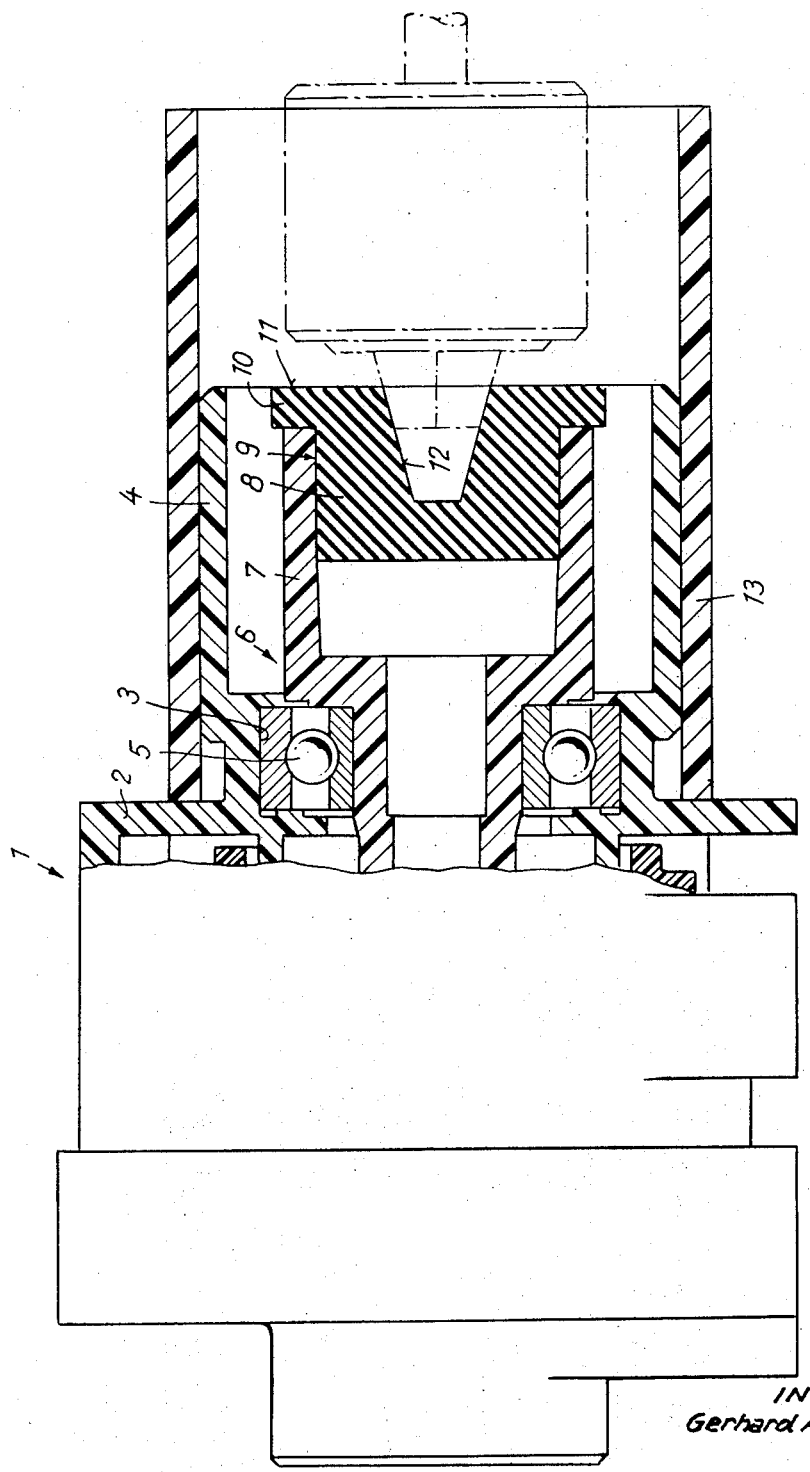
INVENTOR:
Gerhard ARMBRUSTER
BY
his ATTORNEY

COUPLING CONSTRUCTION

This is a continuation, of U.S. Pat. application Ser. No. 139,612 filed May 3, 1971, now abandoned now Ser. No. 372,407 filed June 21, 1973.

BACKGROUND OF THE INVENTION

The present invention relates generally to couplings, and more particularly to a novel coupling in an attachment for transmitting power from a motor-driven tool, to an auxiliary tool.

It is becoming increasingly popular to use motor-driven basic tools, such as manual power drills, as the power unit for an entire line of auxiliary tools. For instance, a power drill may be used to power a sander, a saber-saw attachment or the like. It is also known to use the rotary drill to power rotary saws or circular saws, knife and scissor attachments, and other devices. This makes economic sense because it permits a relatively inexpensive construction of the attachments which need not have a motor and rely for their power upon the basic motor-driven tool, that is the drill or whatever tool is the motor-driven one.

However, it is obviously necessary in this case to provide a coupling arrangement for releasably coupling the auxiliary tools with the power-driven tool in order to obtain the necessary drive for the auxiliary tools. For this purpose it is at least necessary to drivingly connect the output shaft of the motor-driven tool with the input shaft of the auxiliary tool. In some cases, the housings of the two tools are also connected. For connecting the output and input shafts it is known to unscrew the chuck of the drill, if the power-driven tool is in face a drill, and to thread a coupling of the auxiliary tool onto the output shaft which normally carries the chuck. This is basically a satisfactory arrangement, as is another known construction wherein the chuck of the drill is used to engage a portion of the input shaft of the auxiliary tool — in the same manner it would normally engage a drill bit — and to transmit power in that way.

These known approaches however have the disadvantage that the connection between the two tools is relatively time-consuming, that a suitable tool is necessary for removing the chuck and replacing it with the coupling of the auxiliary tool, and that a suitable tool is necessary for opening and closing the chuck. All of this is rather too time-consuming and laborious for such instances where only a brief use of the auxiliary tool is required, and where only for a brief period of time a relatively small torque must be transmitted, for instance if the auxiliary tool is one that is used for re-sharpening drill bits or for similar purposes.

For such applications it is desirable to have a coupling which permits rapid and very simple coupling of the power-driven tool and the auxiliary tool for a brief period of time, without the necessity of utilizing tools for establishing and releasing the coupling, and without requiring more than moments to establish and release the coupling. In short, it should be possible to establish and maintain a press-type of connection which is released when pressure is released.

SUMMARY OF THE INVENTION

It is, accordingly, an object of the present invention to provide an improved attachment construction which affords this advantage.

More particularly, it is an object of the present invention to provide an improved coupling construction in such an attachment which makes it possible to achieve the above-identified purposes and to avoid the disadvantages of the prior art.

A concomitant object of the invention is to provide such an improved coupling which is simple in its construction and operation.

In pursuance of the above objects and of others which will become apparent hereinafter, one feature of the invention resides, briefly stated, in attachment which is particularly but not exclusively suitable for transmitting power between a motor-driven tool and an auxiliary tool. This attachment comprises a rotary shaft having one end portion drivingly connectable with an auxiliary tool and another end portion. A coupling member is provided on the other end portion for rotation therewith and has an end face extending transversely of the axis of rotation of the shaft, this end face being provided with a conical recess extending axially of the shaft and bounded by friction-promoting wall means so as to frictionally engage and be rotated by a rotating component inserted into the recess and contacting the wall means under pressure directed substantially axially of the shaft.

The friction-promoting wall means is preferably friction-promoting by virtue of the fact that it is elastically yieldable, and advantageously, the entire coupling member is composed of an elastomeric material to obtain this characteristic. To make the coupling particularly suitable for receiving power from an electric drill, the recess may be so configurated that it accommodates either the jaws of a three-jaw chuck of conventional construction, or it accommodates both the jaws and the casing of the chuck. In this case the circumferential wall bounding the cavity or recess is preferably tapered at an angle of approximately 15° with reference to the axis of rotation of the shaft.

Of course, in the construction and design of such an attachment, safety considerations must also play an important role. In order to eliminate or at least reduce the danger that the rotating components of the attachment and/or of the power-supplying tool might be touched by a user, it is preferable to surround the coupling element with a stationary sleeve which projects axially beyond the aforementioned end face to such an extent that it surrounds the rotating components of the coupling entirely and at least to a significant extent those components of the power tool which rotate and which transmit rotary motion to the auxiliary tool via the coupling element of the shaft.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a fragmentary, axial section through an attachment according to the present invention.

DESCRIPTION OF THE PREFERRED EMBODIMENT

Reference numeral 1 identifies an attachment for my auxiliary tool which may be of any of the types discussed earlier, or of other types which are suitable for such purposes. Conversely, reference numeral 14 identifies in broken lines for purposes of orientation a conventional three-jaw chuck such as are used on electric drills. Of course, this is for information only, it being understood that other motor-driven tools and components of such tools may be used for transmitting rotary motion via the coupling to the drive shaft of the attachment 1.

Reference numeral 2 identifies the housing of the attachment 1, in which there is formed a bearing seat 3. The housing projects as a hollow cylinder 4 past the seat 3 in which there is mounted a ball bearing 5 journalling a hollow drive shaft 6. Portion 7 of the drive shaft is configured as a hollow sleeve as illustrated and has mounted nonrotatably — with reference to the portion 7 — a coupling element 8 which in the illustrated embodiment is composed of elastomeric material and has a cylindrical portion 9. The free end of the coupling element 8 has a flange 10 projecting radially and formed with an end face 11 extending transversely to the axis of rotation of the shaft 6 and provided with a central recess 12 extending axially of the shaft 6 and having a conical configuration with an inner circumferential surface which defines with the axis of rotation of the shaft 6 an angle of approximately 15°. This angle may, however, differ. The free end face 11 is approximately flush with the free end of the cylindrical portion 4 of the housing 2, as illustrated.

As the drawing shows, a sleeve 13 surrounds the cylindrical portion 4 of the housing 2 and projects beyond the end of the cylindrical portion 4 and therefore beyond the end face 11 of the coupling element 8, to such an extent that it completely covers the coupling element 8 and the motion-transmitting portion of the tool which cooperates via the recess 12 with the coupling element 8. In the illustrated embodiment, the power-driven and therefore motion-transmitting tool is assumed to be an electric drill whose chuck 14 and projecting jaws are illustrated in broken lines, with the jaws being received in the recess 12 as illustrated. The recess 12 can of course be so configurated that it will receive the entire chuck 14, that is the jaws and the casing therefor.

It will be clear from the drawing and what has been discussed above that the coupling according to the present invention is actuated simply by gripping the attachment 1 in suitable manner and pressing the rotary component of the power-driven tool — in this case the chuck 14 of the drill — into the recess 12 so that frictional engagement of the circumferential wall of the recess 12 establishes a motion-transmitting coupling with the coupling element 8, whereby the shaft 6 is rotated. Of course, the drill or other motion-transmitting tool may be mounted on a worktable or the like, if desired. During such connection, the sleeve 13 covers the chuck or other rotary component of the power-driven tool and prevents contact therewith by a user, and damage or injury to the user. The sleeve 13 may of course be made so long that it will completely cover a relatively long chuck. Naturally, this does not exhaust the possiblities inherent in the present invention. Instead, the element 8 can also be so configurated that it can cooperate with other rotary components of a motor-driven tool, and that it can cooperate with tools other than a drill.

It will be understood that each of the elements described above, or two or more together, may also find a useful application in other types of constructions differing from the types described above.

While the invention has been illustrated and described as embodied in a coupling construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An attachment to a motor-driven tool having a rotating component, comprising a shaft mounted for rotation about an axis and having one end portion drivingly connectable with an auxiliary tool, and another end portion of substantially sleeve-shaped configuration; an elongated coupling member of elastomeric friction-promoting material fittingly accommodated and exteriorly confined over at least a substantial portion of its length in said other end portion for rotation with said shaft, said coupling member having an axially outwardly exposed end face extending transversely of the axis of rotation of said shaft, and wall means bounding in said coupling member a conical recess extending coaxially with said shaft inwardly from said end face and into said substantial portion, the rotating component of the motor-driven tool being insertable into said recess and contacting said wall means under pressure directed substantially axially of said shaft to thereby frictionally entrain and rotate said coupling member, the exterior confinement of said wall means by fitting accommodation in said other end portion serving to assure centering of said shaft and rotating component with reference to one another.

2. An attachment as defined in claim 1, wherein said rotating component comprises a conically tapering three-jaw chuck; and wherein said recess has a configuration complementary to that of said chuck.

3. An attachment as defined in claim 1, wherein said rotating component comprises a three-jaw chuck; and wherein said recess has a configuration complementary to that of said chuck.

4. An attachment as defined in claim 1, wherein said rotating component comprises a portion which is insertable into said recess; and wherein said recess has a configuration complementary to that of said portion.

5. An attachment as defined in claim 1, wherein said recess is bounded by an inner circumferential surface which includes with said axis of rotation of said shaft an angle of substantially 15°.

6. An attachment as defined in claim 1; and further comprising a stationary sleeve surrounding said coupling member with clearance and projecting axially beyond said end face by a predetermined distance.

* * * * *